Patented Dec. 26, 1922.

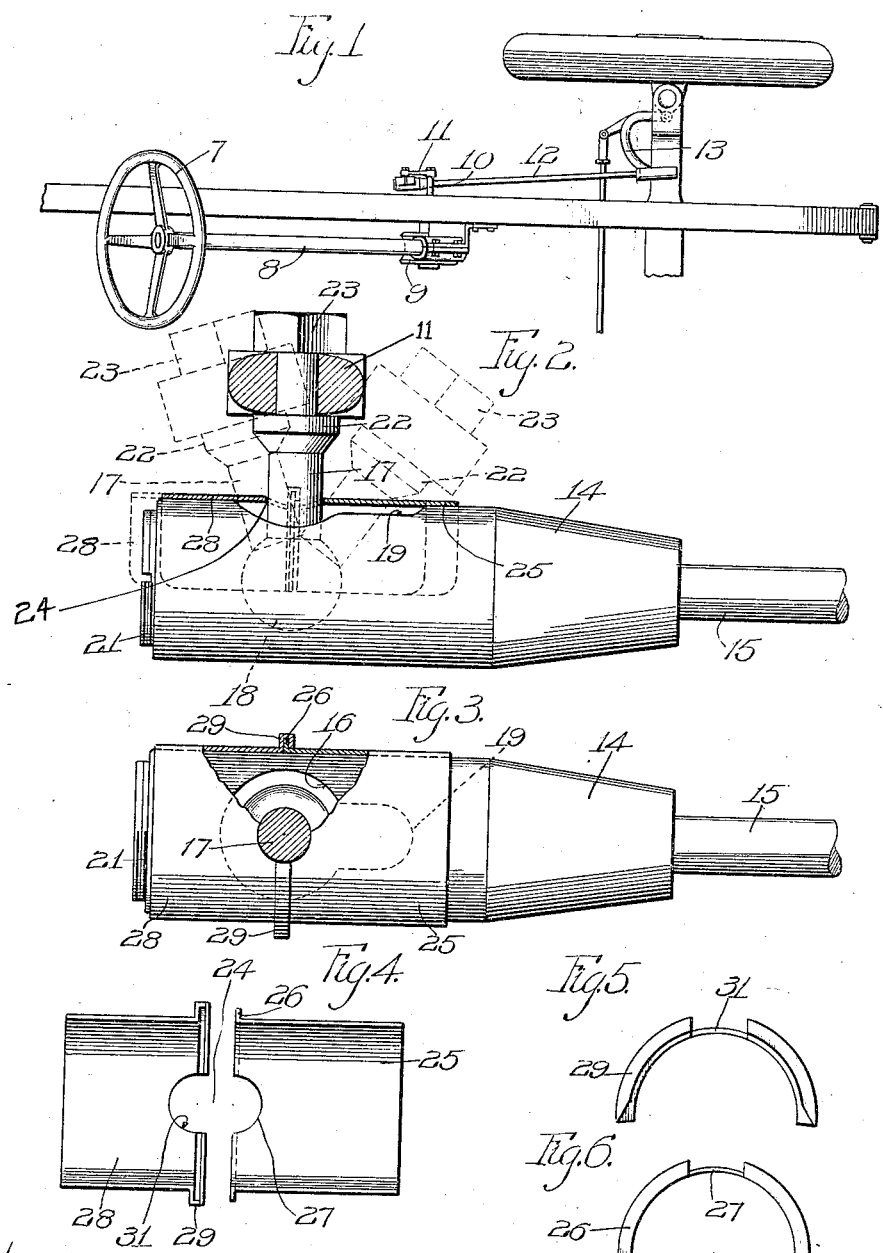

1,439,883

UNITED STATES PATENT OFFICE.

JOHN A. GERMONPREZ, OF DETROIT, MICHIGAN, ASSIGNOR TO FRANK H. STANWOOD, OF CHICAGO, ILLINOIS.

DUSTGUARD FOR DRAG LINKS AND THE LIKE.

Application filed September 29, 1917. Serial No. 193,915.

*To all whom it may concern:*

Be it known that I, JOHN A. GERMONPREZ, a citizen of the United States, residing in Detroit, in the county of Wayne and State of Michigan, have invented a new and useful Improvement in Dustguards for Drag Links and the like, of which the following is a specification.

This invention relates in general to dust or dirt guards for closing the opening into the socket of a ball and socket connection between two members and has particular reference to the connection of this character provided between the drag link and the actuating part therefor in an automobile steering gear although it will be manifest as the invention is better understood that it has other valuable applications.

A principal object of the invention is the provision of a device of this character which will close the slot of a ball and socket connection and this without interfering in any way with the free universal action.

A still further object of the invention is the provision of such device which may be assembled without requiring any change in the parts of the steering apparatus or other structure and without any of the parts being removed for the purpose, thereby permitting the positioning of the dust guard without necessitating appreciable effort or readjustment.

Another object of the invention is the provision of such a guard which will be readily removable to permit access to the interior portion of the connection.

Another object of the invention is the provision of a guard to close the opening in the ball and socket connection, so constructed and arranged that it may act to restrain the leakage of grease or lubricant used in the connection.

A still further object of the invention is the provision of a guard of this character which will be cheaply manufactured.

Other objects and advantages of the invention will be apparent as it is better understood from the following description when considered in connection with the accompanying drawing illustrating a preferred embodiment thereof.

On the drawing,

Figure 1 is a top plan view of the steering apparatus of an automobile provided to illustrate a particular use for the embodiment of the invention shown on the drawing;

Fig. 2 is an enlarged side elevation of the end of the drag link;

Fig. 3 is a top plan view of the same, the parts being broken away;

Fig. 4 is an elevation of the guard embodying my present invention;

Figs. 5 and 6 are detail end views of the parts forming the member shown in Fig. 4.

For the purpose of illustrating my invention, I have shown on the drawing an automobile steering gear of standard construction—that is to say, it has the ordinary steering wheel 7 located at the end of the steering post 8 which, through a worm gear (not shown), actuates a worm gear 9 on a shaft 10 carrying the steering arm 11 connected by a universal joint as will be more particularly described hereinafter, to a drag link 12 in turn connected through link 13 to the wheel axle. An end of the drag link is shown on an enlarged scale in Fig. 2, from which it will be observed that a socket member 14 is engaged on the end 15 of the drag link and this socket member is hollow at its end remote from the link, a slot 16 being provided in the side to receive the stud or post 17 carrying a ball 18 which may be disposed inwardly with respect to said slot and in the socket of said member. A heavy spring (not shown) bears against one side of said ball, and a screw plug 21 against the other. The post 17 is provided, in accordance with the usual custom, with an integral outwardly extending collar 22 against which rests the end of the arm 11 which is secured to the end of the post, a nut 23 being provided to hold the same in place. The slot 16 is of general circular form much larger than the part of the post 17 extending through it and extends upwardly at one side 19 to give a greater range of movement lengthwise or axially of the drag link than across the link.

So much of the structure may be of standard and well known construction and I have provided a guard to close such opening without obstructing relative movement of the parts which may be incorporated in the present standard structures and this without requiring any change or readjustment of the same. The embodiment of my invention in the present instance consists of a two-part member, preferably of sheet metal, bent to cylindric form and capable of being snapped over the cylindric body of the end of the link, an aperture 24 being provided through which the post 17 may extend. The two parts differ little in construction, one 25 being preferably longer than the other and having an outwardly extending flange 26 at one curved edge, in which edge is provided a semi-circular recess 27 to partially fit about the post 17. The other part 28 is provided with a channel 29 along a curved edge and adapted to be snapped over the flange 26 of the part 25 and in the adjacent edge of this part a semi-circular recess 31 is formed. When it is desired to assemble the parts, the part 25 is merely snapped about the socket member, being of sufficient arcuate length to pass the center of said socket member so that when snapped in place it will be held against displacement and at the same time be free to move with the part 17. The other part 28 is then similarly positioned, the channel 29 being forced down over the flange 26. When so arranged the swinging movement of the post 17 lengthwise of the drag link is accompanied by an axial movement of the guard, and angular movement of the post with respect to the axis of the drag link is accompanied by like arcuate or angular movement of the guard. The combined movements of the post result in similarly combined movements of the guard. The parts can be removed as occasion may require by reversing the assembling operation and without unfastening any of the steering gear parts.

The guard furnishes a means for restraining lubricant placed in the socket to facilitate the ball action. The guard parts are preferably made of strong thin springy steel material which need not be of excellent quality, the material used in making the body of an automobile having been found to be adequate for the purpose.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. The combination of a cylindric part having a ball receiving slot in its side, a ball part having a ball on its end and engaging in said slot to form a ball and socket joint, and a slidable two-part metal member embracing said cylindric part and joined together by interlocking engagement of their adjoining edges substantially throughout their length at said ball part.

2. The combination of a cylindric part having a ball receiving slot in its side, a ball part having a ball on its end and engaging in said slot to form a ball and socket joint, and a two-part metal member embracing said cylindric part and joined by their adjoining edges at said ball part said adjoining edges being snapped into releasable engagement substantially throughout their length, whereby the parts of said member are readily separable to permit removal of said member.

3. In an automobile steering apparatus, the combination of a drag link, a ball part connected therewith and two sheet metal members partly embracing the drag link with the shank of the ball part between them, the adjacent edges of said members being inter-engaged circumferentially at the socket member.

4. A guard for a drag link of an automobile or the like, comprising two sheet metal parts adapted to be snapped about the body of the link in side by side relation, the adjoining edges extending circumferentially of the drag link and being interlocked.

5. A guard for a drag link of an automobile or the like, comprising two sheet metal parts adapted to be individually snapped about the body of the drag link in side by side relation, the adjacent edges overlying and the outer holding the inner part in place.

Signed in the presence of two subscribing witnesses.

JOHN A. GERMONPREZ.

Witnesses:
H. P. FRY,
M. L. BUSH.